US010274328B2

(12) United States Patent
Grochocki, Jr. et al.

(10) Patent No.: US 10,274,328 B2
(45) Date of Patent: Apr. 30, 2019

(54) GENERATING PERSONALIZED ROUTES WITH ROUTE DEVIATION INFORMATION

(71) Applicant: Microsoft Technology Licensing, LLC, Redmond, WA (US)

(72) Inventors: David Grochocki, Jr., Seattle, WA (US); Elizabeth Salowitz, Seattle, WA (US); Ana Lilia Otero Diaz, Woodinville, WA (US); Kshitij Sethi, Bellevue, WA (US); Kshitij Mehta, Bothell, WA (US); Jeff West, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 91 days.

(21) Appl. No.: 15/243,631

(22) Filed: Aug. 22, 2016

(65) Prior Publication Data

US 2018/0051997 A1     Feb. 22, 2018

(51) Int. Cl.
*G01C 21/34*     (2006.01)
*G01C 21/36*     (2006.01)

(52) U.S. Cl.
CPC ..... *G01C 21/3446* (2013.01); *G01C 21/3415* (2013.01); *G01C 21/3423* (2013.01); *G01C 21/3676* (2013.01)

(58) Field of Classification Search
CPC ............ G01C 21/3446; G01C 21/3676; G01C 21/3415; G01C 21/3423
See application file for complete search history.

(56) References Cited

U.S. PATENT DOCUMENTS 6,885,937 B1    4/2005   Suranyi
8,635,017 B2 *   1/2014   Geelen .................. G01C 21/32
                                                340/995.25

(Continued)

OTHER PUBLICATIONS

Delling, et al., "Navigation Made Personal: Inferring Driving Preferences from GPS Traces*", In Proceedings of the 23rd SIGSPATIAL International Conference on Advances in Geographic Information Systems, Nov. 3, 2015, 9 pages.

(Continued)

*Primary Examiner* — Anne M Antonucci
(74) *Attorney, Agent, or Firm* — Alleman Hall Creasman & Tuttle LLP

(57) ABSTRACT

A navigation device may include one or more input devices, a processor, and one or more output devices. A navigation device may read stored map information and stored route deviation information including one or more deviation segments having a divergence location, a deviation path, a reconvergence location, and deviation segment data. The processor of the navigation device may then generate a route and route data. Upon determining that each of the one or more deviation segments intersects the route and a predetermined subset of the deviation segment data matches a corresponding subset of the route data, the navigation device may generate a personalized route by replacing a route portion between a first intersection point and a last intersection point with a corresponding deviation portion for each intersecting deviation segment. The one or more output devices may then output the route and the one or more personalized routes.

19 Claims, 9 Drawing Sheets

(56) References Cited

U.S. PATENT DOCUMENTS

| | | |
|---|---|---|
| 2005/0102098 A1 | 5/2005 | Montealegre et al. |
| 2006/0178822 A1 | 8/2006 | Lee |
| 2007/0156330 A1 | 7/2007 | Goldberg et al. |
| 2010/0125409 A1 | 5/2010 | Prehofer |
| 2010/0211304 A1 | 8/2010 | Hwang et al. |
| 2012/0221243 A1 | 8/2012 | Basson et al. |
| 2014/0229101 A1 | 8/2014 | Glaser et al. |
| 2015/0032366 A1 | 1/2015 | Man et al. |
| 2015/0032424 A1 | 1/2015 | Gupta et al. |
| 2015/0160014 A1* | 6/2015 | Hewitt .................. G01C 21/20 701/522 |
| 2017/0314944 A1* | 11/2017 | Konig ................ G01C 21/3415 |
| 2018/0094943 A1 | 4/2018 | Grochocki et al. |

OTHER PUBLICATIONS

Ceikute, et al., "Routing Service Quality—Local Driver Behavior Versus Routing Services", In Proceedings of IEEE 14th International Conference on Mobile Data Management, vol. 1, Jun. 3, 2013, 10 pages.

Sieber, Tina., "Create Google Maps of Your Own to Share & Collaborate With Friends", Published on: Feb. 12, 2013 Available at: http://www.makeuseof.com/tag/create-google-maps-of-your-own-to-share-collaborate-with-friends/.

Völkel, Thorsten., "Personalized and adaptive navigation based on multimodal annotation", In Proceedings of ACM SIGACCESS Accessibility and Computing, Issue 86, Sep. 2006, pp. 4-7.

\* cited by examiner

GENERATING PERSONALIZED ROUTES WITH ROUTE DEVIATION INFORMATION

BACKGROUND

Routing services have been developed that can respond to user queries for routes from a starting location to an ending location with a suggested route, using map data, a user specified travel mode (e.g., walking, driving, biking, or riding public transportation), and current traffic information crowdsourced from signals received from users mobile electronic devices traveling within the map area. These routing services may use algorithms to estimate travel time along various possible routes based on current traffic conditions, and may display suggested routes, ranked by total travel time.

SUMMARY

A navigation device and method for generating personalized routes from route deviation information are disclosed herein. In one example, a navigation device includes one or more input devices configured to receive a starting location and an ending location, a processor, and one or more output devices. The processor is configured to read stored map information and stored route deviation information including one or more deviation segments having a divergence location, a deviation path, a reconvergence location, and deviation segment data. Using this information, the processor then generates a route and route data, and, upon determining that each of the one or more deviation segments intersects the route and a predetermined subset of the deviation segment data matches a corresponding subset of the route data, generates a personalized route by replacing a route portion between a first intersection point and a last intersection point with a corresponding deviation portion for each intersecting deviation segment. The one or more output devices then output the route and the one or more personalized routes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

The inventors of the subject application have discovered a drawback with the navigation systems described in the Background above, namely, that not all users may perceive a route that is ranked highly by the navigation system to be preferable to alternative routes. Indeed, depending on their driving skills, preferences, and temperaments, users may perceive routes differently, and a route that is preferable to a first driver may be less preferable to a second driver. For example, some drivers may prefer scenic routes, others may prefer routes in which they can drive more aggressively around curves or at higher speeds, others may prefer routes that are slower, and still other drivers may prefer to avoid traffic congestion even if a congested route is fastest. Further, these minor variations in preferences are not recognizable by current routing systems, and thus such systems may systematically output routes that are less than optimal to certain users, which may result in user dissatisfaction over time. The present disclosure attempts to address this drawback and avoid such user dissatisfaction by providing personalized routes.

Figure 1:
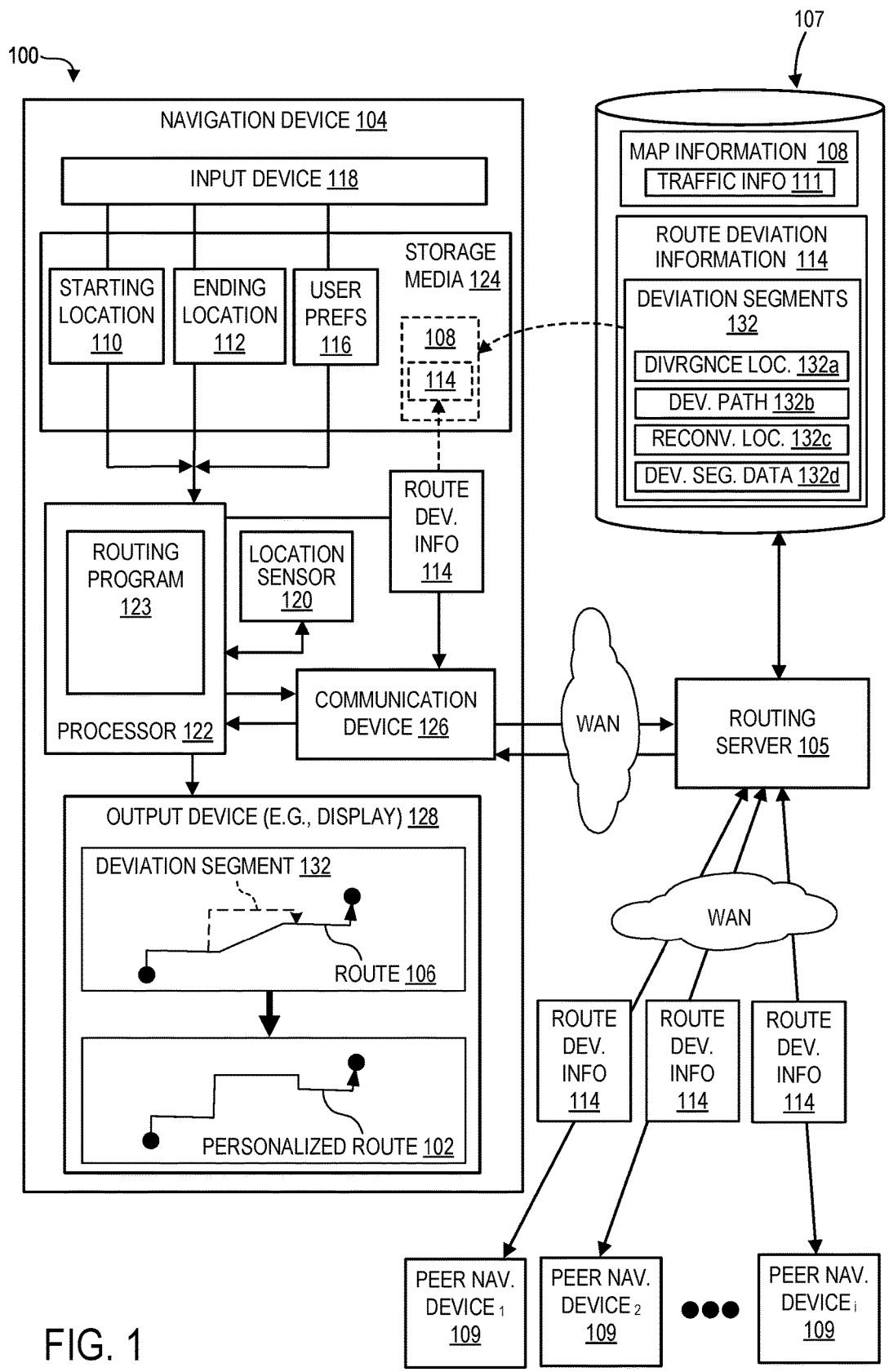
FIG. 1 shows a block diagram of an example computing system to generate personalized routes using route deviation information.

FIG. 1 shows an example computing system 100 for generating one or more personalized routes 102. In the computing system 100, a navigation device 104 may comprise one or more input devices 118, one or more location sensors 120, a processor 122 configured to execute a routing program 123, one or more storage media 124, one or more communication devices 126, and one or more output devices 128. It will be appreciated that the routing program 123 includes program logic to perform the various functions performed by the processor 122 of the navigation device 104. The communication device 126 of the navigation device is configured to be in communication with a routing server 105 via, for example, a wide area network (WAN). The routing server 105 may in turn be in communication with at least a server-side database 107 and one or more peer navigation devices 109. Server-side database 107 includes map information 108, traffic information 111, as well as route deviation information 114 indicating where users have actually deviated from recommended routes during navigation.

The navigation device 104 is configured to generate the one or more personalized routes 102 by (1) monitoring deviations of the navigation device 104 from a standard route, (2) generating route deviation information 114 comprising one or more deviation segments 132 based on each deviation from the standard route, and (3) substituting the deviation segments 132 into future standard routes to create personalized routes 102.

A standard route may be either a route 106 generated by the navigation device 104 in response to a request by a user of the navigation device 104, or the standard route may be a route 106 that is automatically generated in response to a determination that a travel path 130 of the navigation device 104 is a frequent route between a frequent origin/destination pair. The standard route may be between a start and destination location, and in some cases may travel through intermediate waypoints, i.e., the standard route may be a multiple destination route. The standard route may be generated in part based on user preferences that are explicitly input prior to route generation by the user, such as preferences to avoid highways or avoid toll roads. Standard route generation will be discussed in more detail later.

Figure 2:
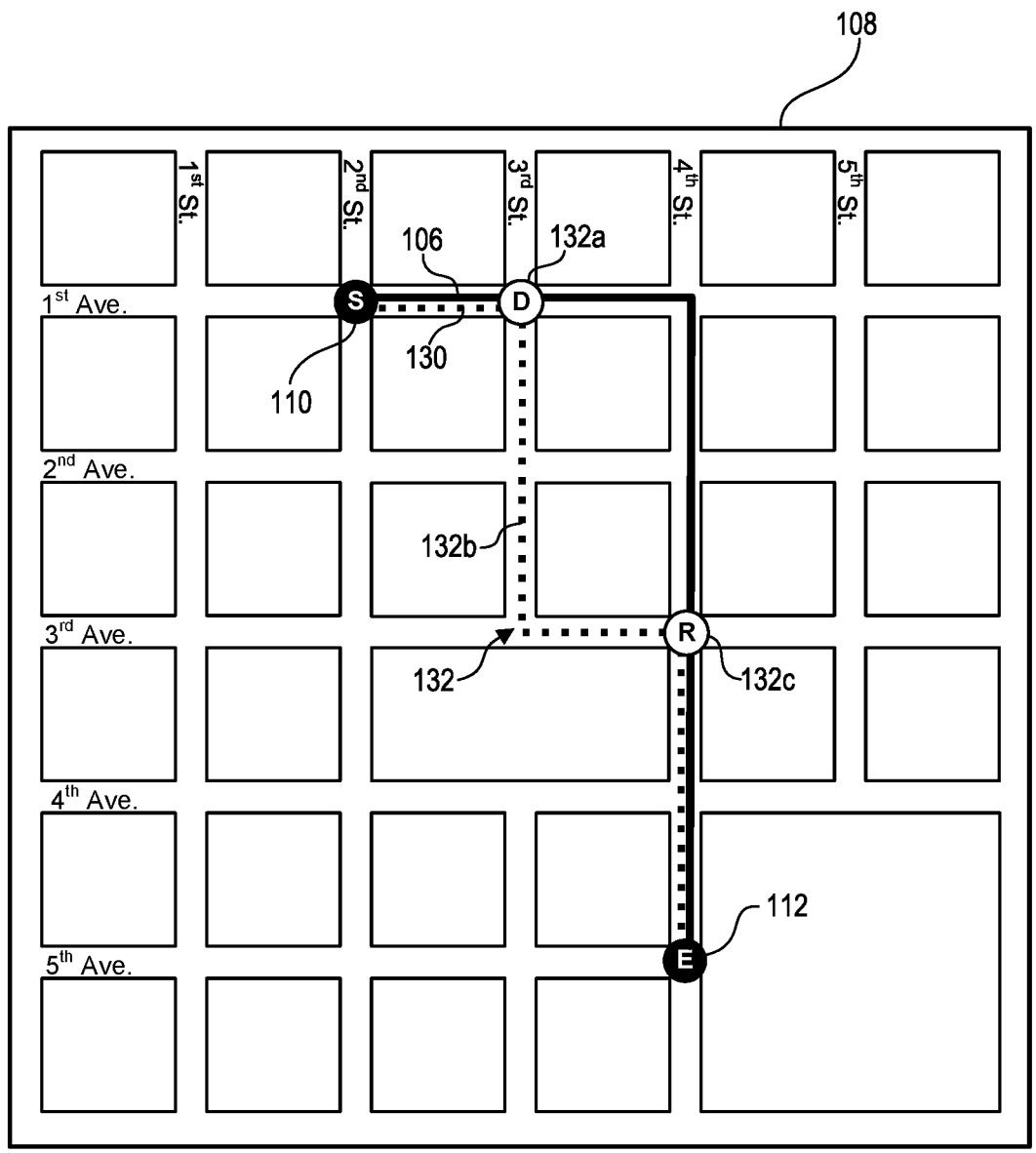
FIG. 2 illustrates an example route and travel path according to one embodiment of the present disclosure.

Turning now to FIG. 2, an example route 106 is shown extending from a starting location 110 to an ending location 112, and the route 106 is displayed overlaid with the map information 108. After generating the route 106, the navigation device 104 determines at least a travel path 130 of the one or more location sensors 120, and the processor 122 is further configured to determine if the travel path 130 deviates from the route 106. In this example, the travel path 130 was determined to deviate from the route 106 along a deviation segment 132. Upon determining that the travel path 130 deviates from the route 106, the processor 122 of the navigation device 104 is further configured to generate route deviation information 114 for one or more deviation segments 132. As graphically represented in FIG. 2 and schematically represented in FIG. 1, each deviation segment 132 includes at least a divergence location 132a indicating a point where the travel path 130 separates from the route 106, a deviation path 132b, a reconvergence location 132c indicating a point where the travel path 130 rejoins the route 106, and deviation segment data 132d, the latter of which is shown only schematically in FIG. 1. Furthermore, the deviation path 132b extends between the divergence location 132a and a reconvergence location 132c. This allows the navigation device 104 to build a collection of personalized deviation segments (e.g. shortcuts) by identifying common variations from standard routes and familiar journeys a user of the navigation device takes.

Deviation segment data 132d may include information about the deviation segment 132 and the context in which the deviation segment 132 is used. For example, the deviation segment data 132d may include one or more of a time of day, a day of the week, a traffic condition, a direction of travel, a type of road, a weather condition, length of the deviation path, a frequency of travel, a topographic change, a transportation mode, a relative distance along the route, or any other aspect of the deviation segment 132 or contextual aspect about the deviation segment 132 while it is traveled by a user. This information may be used by the navigation device 104 to identify patterns with which specific deviation segments 132 are used. For example, one deviation segment 132 may be a shortcut used to avoid traffic on a weekday at rush hour, consequently that deviation segment may not be applicable on Sunday afternoons. Alternatively, a deviation segment 132 may be used for safety instead of efficiency, such as a user preferring a specific deviation segment 132 having little topographic variation on snowy days, which may indicate that the user is avoiding a potentially slippery hill. In another example, a deviation may depend on the mode of transportation, such as a user preferring a certain deviation segment 132 while on a bicycle, but not via another mode of transportation. Similarly, a user may only use a specific deviation segment 132 when walking between modes of public transportation, or in a similar situation between any combinations of transportation modes. Other information about the route 106 itself may also explain when a user may only utilize specific deviation segments 132, such as if the deviation segment 132 occurs at the beginning or the end of the route 106. Likewise, a deviation segment may not be bi-directional and might only be applicable for certain directions of travel. For example, a user may only use a specific deviation segment 132 when they are traveling north, but not while traveling south on the same route. Any of the deviation segment data 132d described herein may be used by personalized routing algorithms to determine whether or not a deviation segment 132 should be included in a personalized route 102.

It will be obvious that the above examples are illustrative and not meant to be an exhaustive list. Other categories of deviation segment data 132d may be determined by the navigation device 104 to determine the context of a deviation segment 132, and therefore better predict the usefulness of that deviation segment 132 when generating personalized routes 102. Additionally, a single deviation segment may be used in multiple contexts. For example, a deviation segment 132 may be both a shortcut to avoid traffic and also as a detour to avoid a slippery hill. Accordingly, the navigation device 104 may be configured to utilize a given deviation segment 132 in multiple, different contexts based on subsets of deviation segment data 132d.

Returning to FIG. 1, the route deviation information 114 may either be stored on the storage media 124 of the navigation device 104 or transmitted by the one or more communication devices 126 to a server. In any of the examples described herein, the stored route deviation information 114 may either be route deviation information 114 generated by the navigation device 104 at a time prior to generating the route 106, or route deviation information 114 generated by one or more peer navigation devices 109 at a time prior to generating the route 106.

Once route deviation information 114 has been generated, subsequent requests to generate a route from a starting location 110 to an ending location 112 may cause the navigation device to generate both a route 106 and a personalized route 102. Furthermore, the navigation device 104 may receive user preferences 116 via one or more input devices 118 to further refine the generation of the personalized route 102.

The navigation device 104 is configured to generate a route 106 based at least on map information 108, a starting location 110 and an ending location 112. To generate a requested route, the one or more input devices 118 of the navigation device 104 may be configured to receive the starting location 110 and the ending location 112. The start location 110 may either be input by a user of the navigation device 104 via the one or more input devices 118, or take a default value. For example, the starting location 110 may be a current location detected by the one or more location sensors 120 of the navigation device 104 (e.g., GPS, indoor positioning technology, or the like). Similarly, the ending location 112 may also be input by a user via the one or more input devices 118 or take a default value. Examples of default values of the ending location 112 include current search results, a favorite destination, a home destination, a frequent destination at a given time of day, such as going home after work, or the like.

Upon receiving a starting location 110 and an ending location 112, the processor 122 of the navigation device 104 generates the route 106 with route data 106a based at least on the map information 108, the starting location 110 and the ending location 112. The processor 122 of the navigation device 104 is configured to read stored map information 108 and route deviation information 114. In any of the examples herein, the inputs, outputs, user preferences 116, map information 108, route deviation information 114 and applications can be stored in one or more computer-readable storage media 124 or computer-readable storage devices. However, the storage media 124 may either be a component of the navigation device 104 or on a server in communication with the navigation device 104 through one or more communication devices 126. The processor 122 is then configured to generate a route 106 based at least on the map information 108, the starting location 110 and the ending location 112. The route 106 can be generated based on information as described herein, and known route generation algorithms may be used to preferentially generate a route 106 based on, for example, estimated time of arrival, traffic, use of thoroughfares, and other general information used to provide routes to all users. After route generation, the route 106 may be presented to the user via one or more output devices 128 of the navigation device 104 configured to output the route 106 and one or more personalized routes 102. In practice, the route 106 can be specified in human-readable form as instructions to a user wishing to navigate from the starting location 110 to the ending location 112.

Figure 3A:
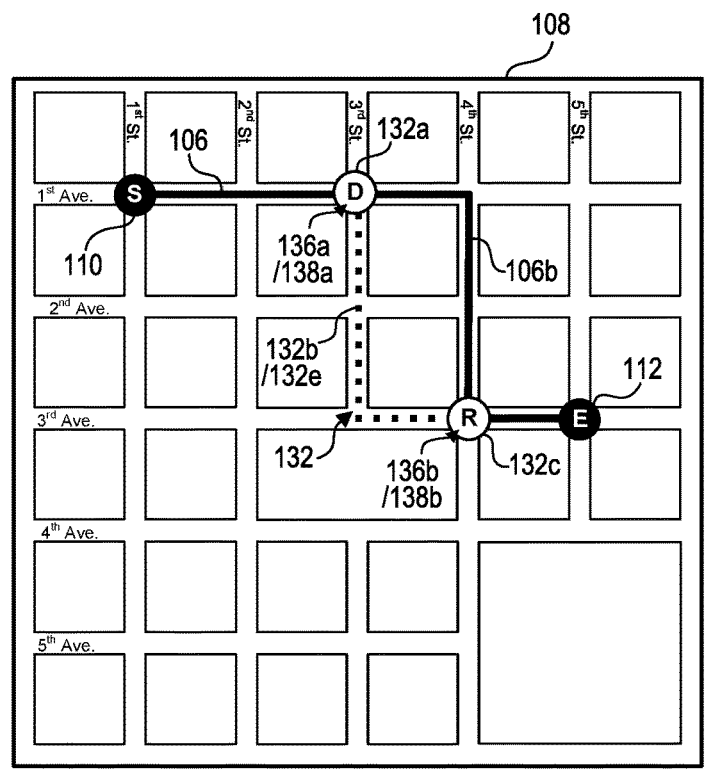
FIGS. 3A-3B illustrate one example scenario to generate a personalized route according to one embodiment of the present disclosure.
Figure 3B:
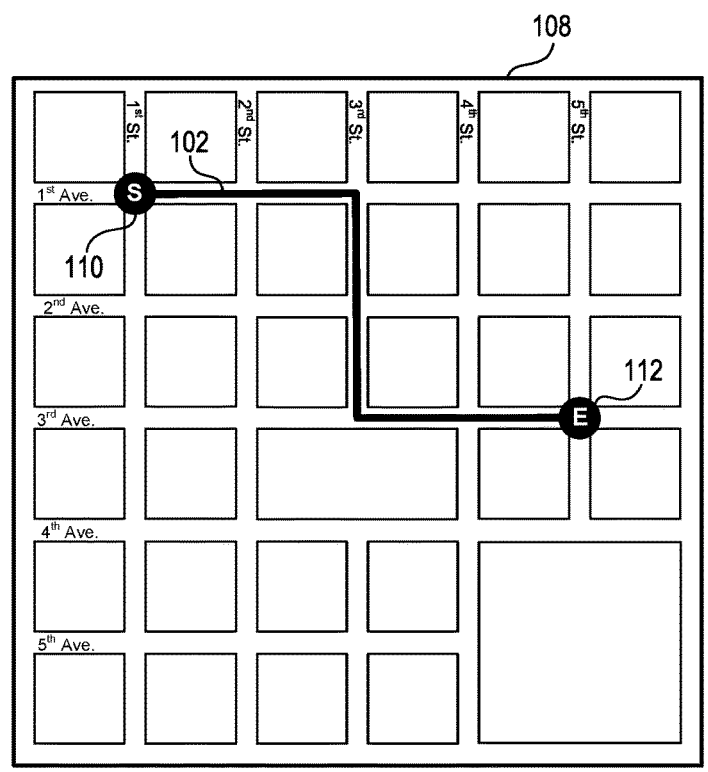

FIGS. 3A and 3B illustrate the use of route deviation information 114 to generate a personalized route 102. The processor 122 is then configured to determine if each of one or more deviation segments 132 of the route deviation information 114 intersects the route 106 at a plurality of intersection points, and if a predetermined subset of the deviation segment data 132d matches a corresponding subset of the route data 106a. In the example shown in FIG. 3A, the deviation segment 132 was found to intersect with the route 106. Upon determination that each of the one or more deviation segments 132 intersects the route 106 at a plurality of intersection points 136, and that a predetermined subset of the deviation segment data 132d matches a corresponding subset of the route data 106a, the processor 122 is further configured to generate one or more personalized routes 102. By replacing a route portion 106b between a first intersection point 138a and a last intersection point 138b of the plurality of intersection points 136 with a corresponding deviation portion 132e of the deviation path 132b for each intersecting deviation segment 132, the personalized route 102 shown in FIG. 3B may be generated.

The one or more output devices 128 may be further configured to output the one or more personalized routes 102 with an indication that the one or more personalized routes 102 are different from the route 106. The indication that the one or more personalized routes 102 are different from the route 106 may be one or more of a label, a color of the route, a sound, or any suitable indication of difference. Furthermore, the route 106 may be generated for a plurality of modes of transportation or combinations of modes of transportation, such as, for example, driving, biking, walking, or riding public transit.

The one or more input devices 118 of the navigation device 104 may be further configured to receive user preferences 116, and the user preferences 116 may comprise at least an option to select the predetermined subset of the deviation segment data 132d. This allows a user of the navigation device 104 to control which aspects of a deviation segment 132 are important when deciding to leave a recommended route. Of course, it will be obvious that the predetermined subset of the deviation segment data 132d may also be automatically selected by the navigation device 104 as a part of default user preferences 116, and a user may then be able to adjust, add or remove the predetermined subset of deviation segment data 132d to fit their needs. The predetermined subset of the deviation segment data 132d may be used by the navigation device 104 to further refine the selection of deviation segments 132 for personalized route generation, as described in more detail below. By identifying patterns in deviation segment data 132d, the navigation device 104 may be configured to present the user with a personalized route 102 that incorporates only deviation segments 132 relevant to the users current environment.

Additionally, the navigation device 104 may be further configured to add information to the deviation segment data 132d via the one or more input devices 118. For example, a user may generate deviation segment data 132d by rating a personalized route 102 based on how useful it was, selecting the personalized route 102 as a "favorite," or selecting not to use a personalized route 102. Each of these selections may increase or decrease the likelihood that the deviation segments 132 within the selected personalized route will be included when generating a personalized route 102 in the future.

Furthermore, deviation segment data 132d may incorporate information about whether or not a personalized route 102 containing a given deviation segment 132 is selected by a user of the navigation device 104 when it is output by the navigation device 104. Importantly, a user may be able to save a deviation segment 132 manually. These manually entered deviation segments 132 and deviation segment data 132d can, in turn, be used to help identify future deviation segments. Users may further view the user preferences 116 and deviation segment data 132d at any time to validate and/or remove misidentified or no-longer-relevant deviation segments 132 so the user is always in control of their data. Based at least on the deviation segment data 132d and user preferences 116, the processor 122 of the navigation device 104 may be further configured to refine the determination that a given deviation segment 132 should be substituted into a route 106.

As discussed above, although a user of the navigation device 104 may request a route 106 to be generated to an ending location 112, generating route deviation information 114 is not limited to doing so for a requested route. Instead, the route deviation information 114 may be generated in response to a determination that a travel path 130 of a frequent route of the navigation device 104 deviates from an automatically generated route. To do this, the navigation device 104 may first identify areas where the user of the navigation device 104 is the expert. For example, the navigation device 104 may be configured to detect a travel path 130 along common routes, which can be identified by any common origin/destination pairs, like home/work, home/grocery store, or other commonly repeated origin/destination pairs. Additionally, the navigation device 104 may be configured to detect a travel path 130 along a frequent route within familiar neighborhoods based on known driver information. For example, when a travel path 130 of the navigation device 104 is within X miles of home or work, an area with a cluster of favorite destinations, commonly visited or traveled parts of a city, or other frequently visited locations may be designated familiar neighborhoods.

To localize the frequent routes, the one or more location sensors 120 may be configured to continually track the location of the location sensors 120 of the navigation device 104. The processor 122 may subsequently use this information to determine frequent routes traveled by the navigation device 104, including frequently used starting locations and frequently used ending locations. A frequently used starting location and a frequent ending location of a frequent route may be received by the navigation device 104 as the starting location 110 and the ending location 112 to generate the route 106. The navigation device 104 may then generate a route 106 between the frequently used starting location and the frequently used destination location (i.e. the starting location 110 and the ending location 112), and determine if the travel path 130 of the frequent route deviates from the automatically generated route. As described above, upon determination that the travel path 130 of the frequent route deviates from the route 106, the processor 122 of the navigation device 104 may then generate route deviation information 114.

In this example, when the user of the navigation device 104 is the expert, the navigation device 104 may build a user profile of route deviation information 114 based on when the user deviates from the standard route returned by the routing algorithm. Automatic detection of route deviation patterns is useful in order to identify user navigation habits, based on common deviation paths and deviation segment data 132*d*, such as specific roads traveled on, roads avoided, etc. In some variations, intermediate stops along the way, such as stopping for gas, or low-frequency variations would not generate deviation segments. Likewise, if the user deviates too far from an original route, these deviation segments 132 would also not be included in the route deviation information 114.

Since most users would not explicitly search for a route 106 they are already familiar with, tracking the travel habits of a user of the navigation device 104 allows the navigation device 104 to build a detailed and thorough set of deviation segments 132 that can be later substituted in to both familiar and less familiar routes. Thus, enhancing the user experiencing by presenting a user with their preferred driving patterns, even in unfamiliar settings.

As described above for the route deviation information 114 generated by the navigation device 104, the route deviation information 114 generated by the one or more peer navigation devices 109 may also be either generated upon determination that a travel path 130 deviates from a requested route or generated in response to a determination that a travel path 130 of a frequent route of the peer navigation device 104 deviates from an automatically generated route. The use of route deviation information 114 generated by peer navigation devices 109 allows a user of a navigation device 104 to access a vast amount of knowledge about the preferred travel patterns of local users who regularly travel a route 106, friends, family, or other groups of peer navigation devices 109 that may be relevant to the user of the navigation device 104. Details about how the navigation device 104 may determine which peer navigation devices 109 to acquire route deviation information 114 from is discussed further below, with reference to user preferences 116.

Turning again to FIG. 3A, the deviation segment 132 and the route 106 were determined to intersect at two intersection points 136*a* and 136*b*, and the deviation segment data 132*d* and the route data 106*a* each indicate a same time of day (not shown).

Notably, the starting location 110 and the ending location 112 of the route 106 in FIG. 3A is different from the starting location 110 and the ending location 112 of the route 106 in FIG. 2. By substituting deviation segments 132 generated based on one route into a different, intersecting route, the route deviation information 114 may be utilized in a variety of contexts to generate a wide variety of personalized routes 102. However, it should be obvious that one or both of the starting location 110 and the ending location 112 of the route 106 in FIG. 3A could be the same as those of the route 106 in FIG. 2.

Figure 4A:
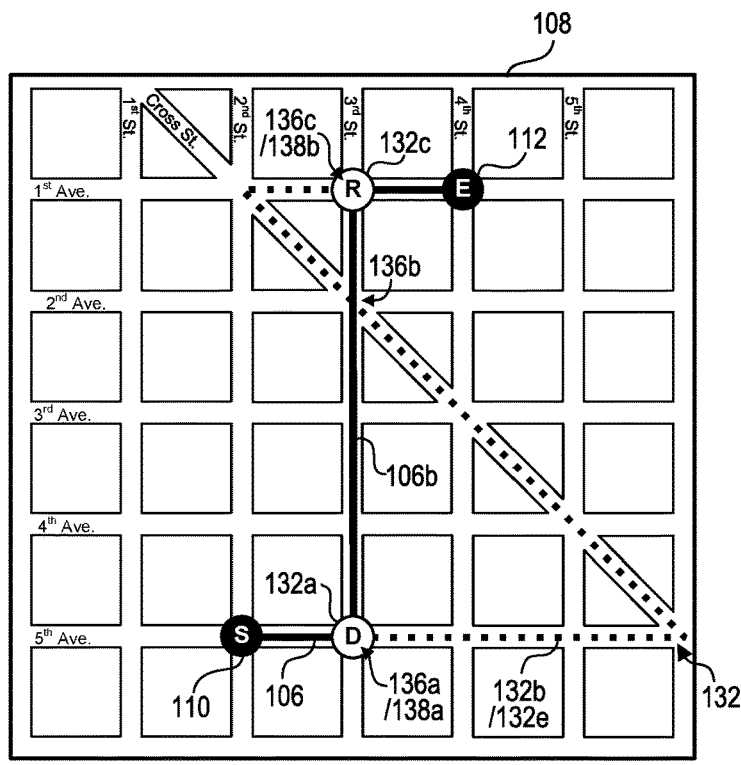
FIGS. 4A-4B illustrate another example scenario to generate a personalized route according to one embodiment of the present disclosure.
Figure 4B:
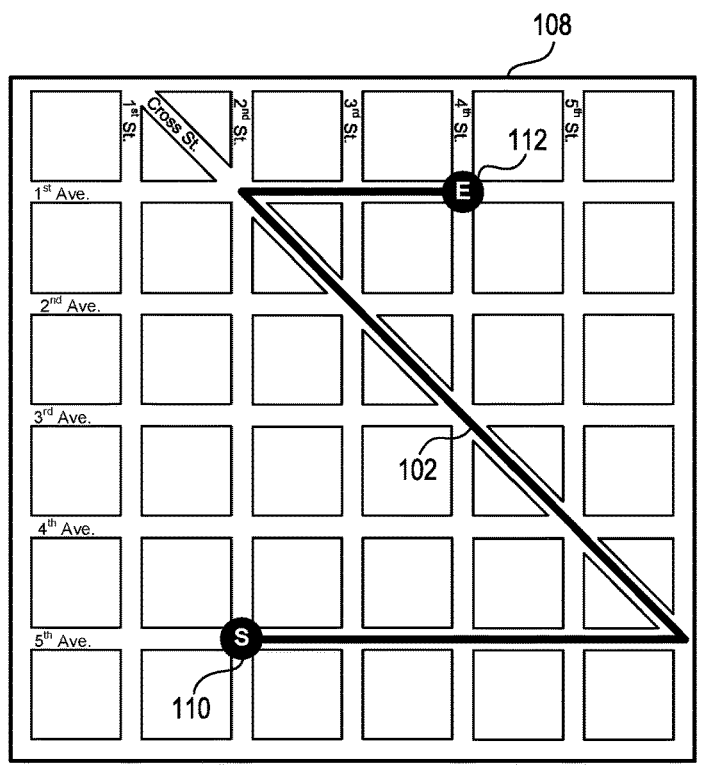

As shown in FIG. 4A, a deviation segment 132 may intersect a route 106 with more than two intersection points 136. In this example, the deviation path 132*b* intersects the route 106 at three intersection points 136*a*, 136*b*, and 136*c*. As with the previous examples, a route portion 106*b* between a first intersection point 138*a* and a last intersection point 138*b* of the plurality of intersection points 136 is replaced with a corresponding deviation portion 132*e* of the deviation path 132*b* to create the personalized route 102 shown in FIG. 4B. In this example, the deviation portion 132*e* and the deviation path 132*b* are the same, the first intersection point 138*a* occurs at the divergence location 132*a*, and the last intersection point 138*b* occurs at the reconvergence location 138*b*. However, as described below, each of those pairs of information could be different from one another. Furthermore, although the first and last intersection points 138*a* and 138*b* used to define the deviation segment 132 represent the first time and last time a deviation path 132*b* encounters the route 106 in this example, the first and last intersection points 138*a* and 138*b* may instead be any pair of intersection points for a single deviation path. For example, in this scenario the navigation device 104 may create two deviation segments 132 from the deviation path 132*b* shown in FIG. 4A instead of one.

Figure 5A:
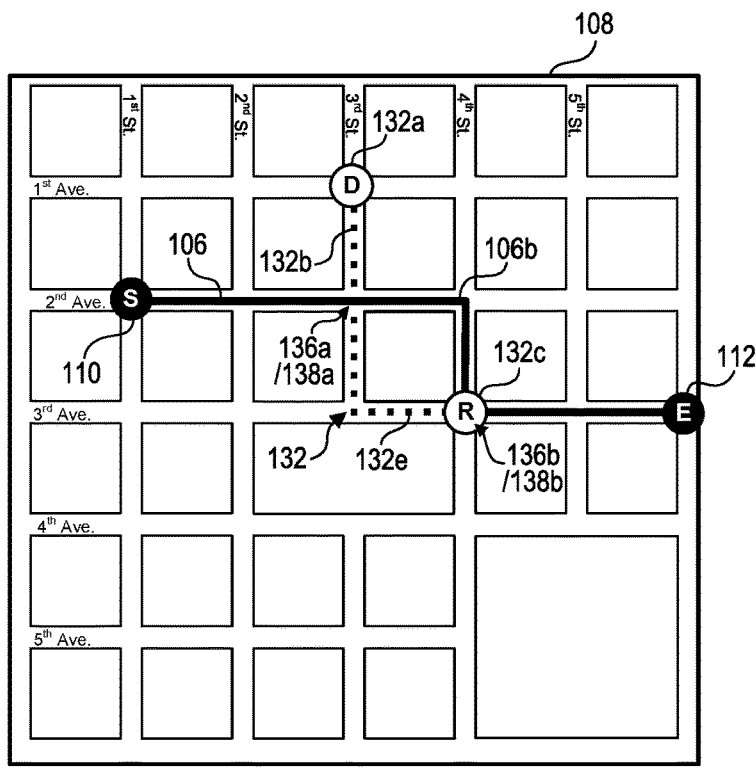
FIGS. 5A-5B illustrate another example scenario to generate a personalized route according to one embodiment of the present disclosure.
Figure 5B:
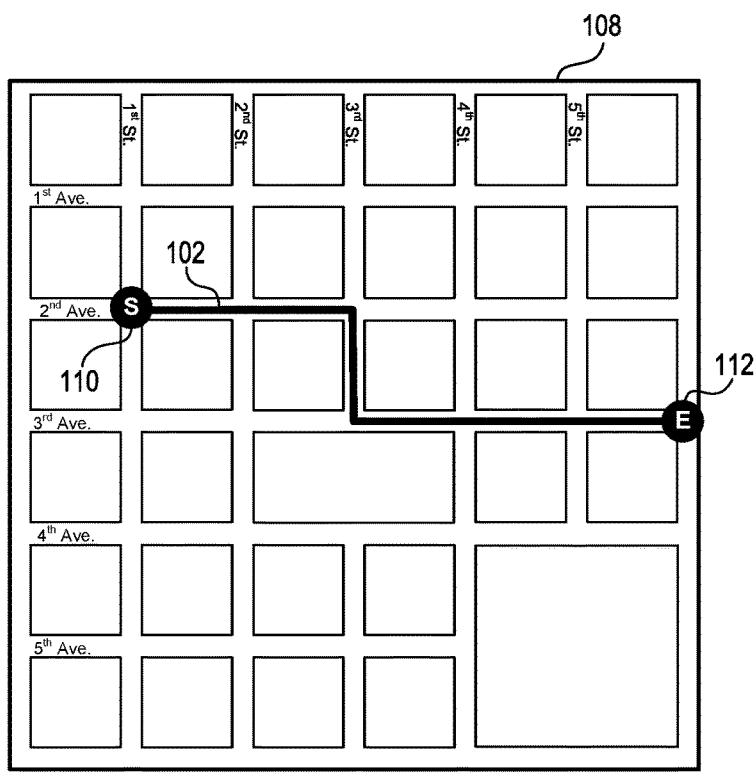

In the examples shown in FIGS. 3A-4B, the two intersection points 136*a* and 136*b* are the divergence point 132*a* and the reconvergence location 132*c*, respectively. However, as shown in FIG. 5A, a deviation segment 132 intersecting a route 106 may form an intersection point 136 at a point along the deviation path 132*b* instead of at an end of the deviation path 132*b*. In this case, the deviation portion 132*e* is only part of the deviation path 132*b*. FIG. 5B illustrates the personalized route 102 generated by substituting the deviation portion 132*e* of the deviation segment 132 for the route portion 106*b* of the route 106 shown in FIG. 5A. In some cases, this form of imprecise matching may be implemented only after a direct match, such as a route deviation segment 132 having its divergence location 132*a* and reconvergence location 132*c* located directly on the route 106, cannot be found. Additionally, in some examples, imprecise matching may be used only in cases where it introduces a minimal amount of rerouting, such as a maximum of a five percent of the total route length. As such, longer deviation segments would lend themselves better to imprecise matching, since their length may justify the rerouting, but may otherwise prove to be inefficient for shorter deviation segments. Imprecise matching of a route 106 to deviation segments 132 that do not precisely overlap with the route 106 at the divergence point 132*a* and reconvergence location 132*c* allows for more adaptability in the generation of personalized routes 102.

Figure 6A:
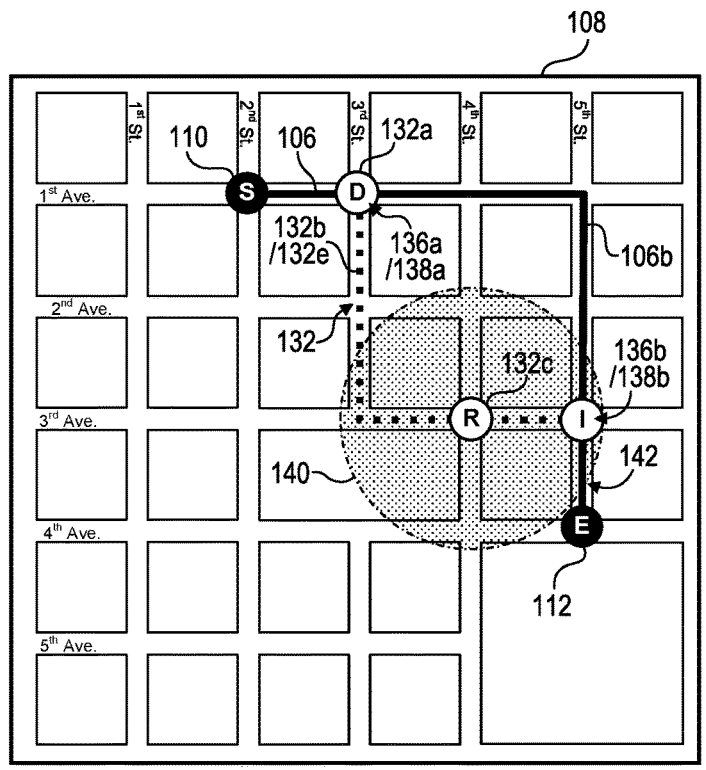
FIGS. 6A-6B illustrate another example scenario to generate a personalized route according to one embodiment of the present disclosure.
Figure 6B:
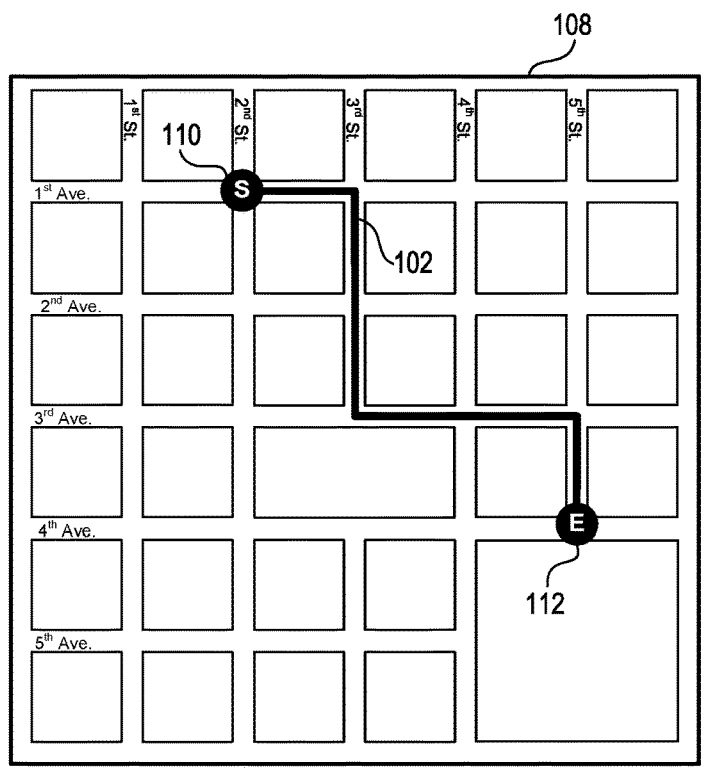

In any of the examples described herein, in addition to the deviation path 132*b* extending between the divergence location 132*a* and the reconvergence location 132*c*, the deviation path 132*b* may also extend a predetermined distance 140 in a plurality of directions from one or both of the divergence location 132*a* and the reconvergence location 132*c*. FIGS. 6A and 6B show the generation of a personalized route 102 from a deviation path 132*b* extending beyond the reconvergence location 132*c* to form a second intersection point 136*b* with the route 106. In this example, the predetermined distance 140 is slightly more than one block, and the intersection point 136*b* is preferentially formed at the last point along the route 106 that intersects the deviation path 132*b* without the deviation path 132*b* and the route 106 following the same path prior to meeting at the last intersection point 138*b*. For example, if the last intersection point 138*b* were located at point 142, then the route 106 and the deviation path 132*b* would following the same path between the intersection point 136*b* and the point 142. Thus, the last intersection point 138*b* is located at the intersection point 136*b* instead. Furthermore, if extending the deviation path 132*b* a predetermined distance 140 in a plurality of directions allows the deviation path 132*b* to intersect with the route 106 at multiple points, then the intersection point 136 furthest along the route 106 is preferentially used, similar to the selection of the last intersection point 138*b* described above. However, in other implementations, if extending the deviation path 132*b* a predetermined distance 140 in a plurality of directions allows the deviation path 132*b* to intersect with the route 106 at multiple points, any suitably definite predetermined criteria may be implemented to select the intersection point 136, such as selecting an intersection point 136 that converges with the route 106 in the shortest distance. This extension of deviation paths 132*b* allows for more combinations of deviation segment 132 substitution, possibly to be adaptability in the generation of personalized routes 102.

As described above, the route deviation information 114 may be generated and saved by one or more peer navigation devices 109 instead of by the navigation device 104. In this case, the navigation device 104 may be further configured to receive the route deviation information 114 via the one or more communication devices 126. Additionally, the one or more peer navigation devices 109 may be clustered into one or more predetermined groups 146. Predetermined groups 146 may be either input directly into the navigation device 104 via the one or more input devices 118 or determined based on one or more member lists accessed by the navigation device 104, such as contacts, family, friends, coworkers, or any relevant group. In other implementations, the navigation device 104 may be configured to create a predetermined group 146 by identifying peer navigation devices 109 in proximity to the navigation device, by identifying peer navigation devices 109 that frequently travel along a route 106, or any by identifying any group relevant to the user of the navigation device 104. By selecting a subset of peer navigation devices 109 from which to populate the route deviation information 114 used to generate the personalized routes 102 of the navigation device 104, the personalized routes 102 presented to a user of the navigation device 104 may be specifically tailored to the needs of the user.

In one example, the navigation device 104 may be configured to identify local "expert" peer navigation devices 109, whose route deviation information 114 covers the area of a route 106 being currently generated by the navigation device 104. By selecting to use "experts" as a predetermined group 146 of peer navigation devices 109 a user of the navigation device 104 may be presented with personalized routes 102 that allow the user to travel like a local, even if the user is in an unfamiliar location.

As described above, the one or more input devices 118 of the navigation device 104 may be further configured to receive user preferences 116, and the user preferences 116 may comprise at least an option to share 144 the route deviation information 114 with one or more predetermined groups 146. Additionally, the user preferences 116 may comprise an option to receive 148 stored route deviation information 114 from one or more predetermined groups 146. Selection of the option to share 144 the route deviation information 114 allows users to share their route deviation information 114 with their friends, family, or other predetermined group 146, and thus enhance the personalized routes 102 of the peer navigation devices 109 as well. Likewise, selection of the option to receive 148 stored route deviation information 114 from friends, family, or other predetermined group 146 may enhance the personalized routes 102 of the user. Furthermore, the user preferences may allow a user of the navigation device 104 to control a driver profile and also to select to share route deviation information 114 or individual deviation segments 132 with friends and family via social media or other sharing mechanisms. Thus allowing users to enhance the routing and travel experiences of those closest to them.

Figure 7:
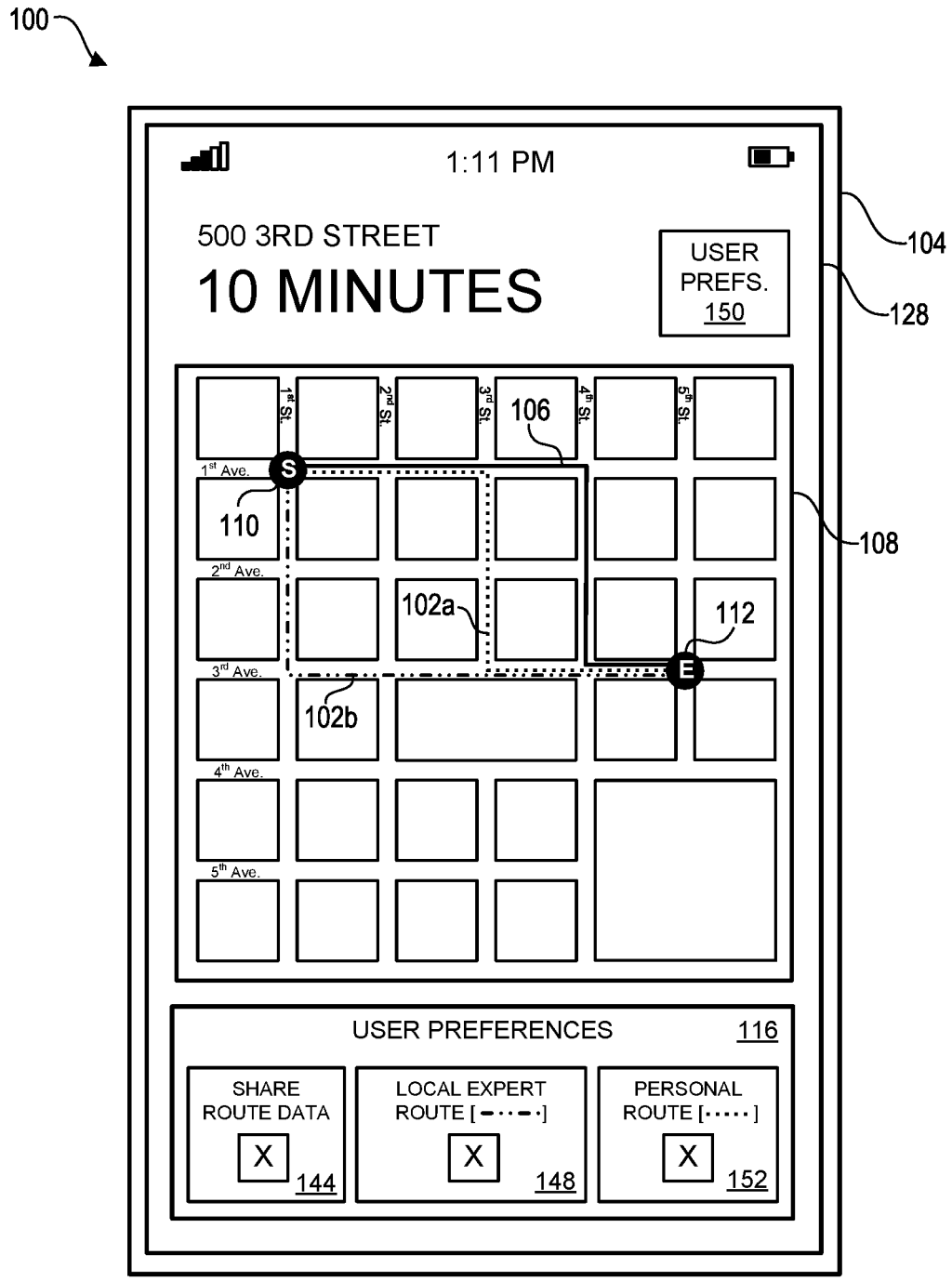
FIG. 7 shows a schematic diagram of an example navigation device of the computing system of FIG. 1.

FIG. 7 shows an example navigation device 104 with a display as an output device 128, the display being configured to output the route 106 and the one or more personalized routes 102. In this example, the navigation device 104 is displaying the route 106 and two personalized routes 102*a* and 102*b*. Selection of an option to set user preferences 150 allows a user of the navigation device 104 to access the option to share 144 the route deviation information 114 generated by the navigation device 104, the option to receive 148 route deviation information 114 from one or more predetermined groups 146, and an option to generate 152 a user-personalized route. The option to generate 152 the user-personalized route may cause the generation and output of the first personalized route 102*a*. The first personalized route 102*a* is generated using route deviation information 114 created by the navigation device 104 and shown here as a "Personal Route." The option to receive 148 route deviation information 114 from one or more predetermined groups 146 may also cause the generation and output of the second personalized route 102*b*. However, separate user preference selections may be made to receive peer route deviation information and to generate a peer-personalized route. Upon selection to generate the peer-personalized route, the second personalized route 102*b* is generated using route deviation information 114 created by peer navigation devices 109 and shown here as a "Local Expert Route." The predetermined group 146 of peer navigation devices 109 is determined via either selected or default user preferences 116, as described above. It should be obvious that the options described above may be accessed via a path other than the selection of an option to set user preferences 150, and may also be set via a default value.

Although the illustrated examples in FIGS. 1-7 depict routes that include one deviation segment, it will be appreciated that the system may be configured to include a plurality of deviation segments in a single final route transmitted to a user. For example, two, three, four, or more deviation segments may be included in a route. The calculation of each deviation segment may be performed in the manner described above.

Figure 8:
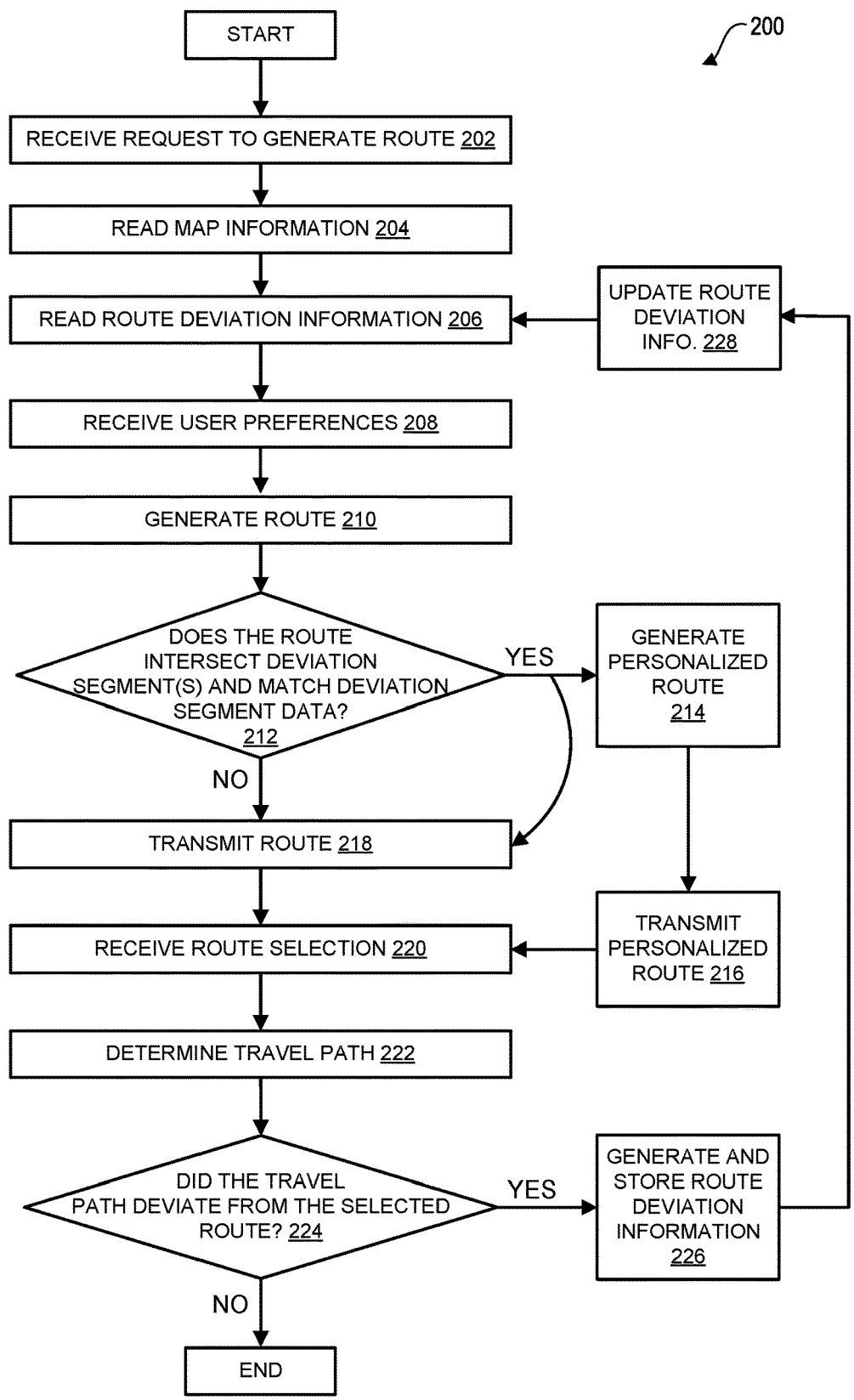
FIG. 8 shows a flowchart for a method of generating personalized routes.

FIG. 8 shows a flow diagram depicting an example method 200 implemented at least in part by a navigation device for generating personalized routes from route deviation information. The following description of method 200 is provided with reference to the software and hardware components described above and shown in FIGS. 1-7. It will be appreciated that method 200 also may be performed in other contexts using other suitable hardware and software components.

At 202, the method may include receiving a request to generate a route 106 from a starting location 110 to an ending location 112. In some examples, the request to generate the route 106 may be input into the navigation device 104 via an input device 118. However, the request to generate the route may also be sent via the navigation device 104 upon determination that a travel path 130 of the navigation device 104 is a frequently traveled route. At 204, the method may include reading stored map information 108. At 206, the method may further include reading route deviation information 114, wherein the route deviation information 114 includes one or more deviation segments 132 having a divergence location 132a, a deviation path 132b, a reconvergence location 132c, and deviation segment data 132d. As described above, in any of the examples described herein, the route deviation information 114 may either be generated by the navigation device 104, or generated by one or more peer navigation devices 109.

In some examples, the deviation path 132b may extend between the divergence location 132a and the reconvergence location 132c. However, the method may also incorporate deviation segments wherein the deviation path 132b further extends a predetermined distance 140 in a plurality of directions from one or both of the divergence location 132a and the reconvergence location 132c. Additionally, the deviation segment data 132d may include information about the deviation segment 132 and the context in which the deviation segment 132 is used. At 208, the method may further include receiving user preferences 116, as described above.

Continuing with method 200, at 210, the navigation device 104 may generate the route 106 with route data 106a based at least on the stored map information 108, the starting location 110 and the ending location 112. At 212, after generating the route 106, the navigation device 104 may then determine if each of the one or more deviation segments 132 included in the stored route deviation information 114 intersects the route 106 at a plurality of intersection points 136, and if a predetermined subset of the deviation segment data 132d matches a corresponding subset of the route data 106a. The predetermined subset of the deviation segment data 132d may be determined based on the user preferences 116. Although the predetermined subset of the deviation segment data 132d may be selected manually by a user of the navigation device 104, the predetermined subset of the deviation segment data 132d may also be automatically selected by the navigation device 104 as a part of default user preferences.

At 214, if the navigation device 104 determines that each of the one or more deviation segments 132 intersects with the route 106 at the plurality of intersection points 136 and the predetermined subset of the deviation segment data 132d matches the corresponding subset of the route data 106a, the navigation device 104 may then generate one or more personalized routes 102 by replacing a route portion 106b between a first intersection point 138a and a last intersection point 138b of the plurality of intersection points 136 with a corresponding deviation portion 132e for each intersecting deviation segment 132. Furthermore, the navigation device 104 may then output at least the route 106 and the personalized route 102 to an output device 128, as shown at 216 and 218.

If the navigation device 104 does not determine that each of the one or more deviation segments 132 intersects with the route 106 at the plurality of intersection points 136 or that the predetermined subset of the deviation segment data 132d matches the corresponding subset of the route data 106a, then the navigation device 104 may only transmit the route 106 to the output device 128, as shown at 218.

Continuing with method 200, at 220, if both the route 106 and the personalized route 102 are transmitted to the output device 128, then the navigation device 104 may then receive a route selection, the route selection being an indication that a user of the navigation device 104 wishes to follow either the route 106 or the personalized route 102. However, if only the route 106 is generated, then the route selection may automatically default to the route 106.

In another non-limiting example, the method may comprise receiving at least a location of the navigation device 104 via one or more location sensors 120 and tracking the location of the navigation device 104. At 222, the method may include using the tracked location of the navigation device 104 to determine a travel path 130 of the navigation device 104. At 224, the navigation device 104 may then determine if the travel path 130 deviates from the route 106. If it is determined that the travel path 130 does not deviate from the route 106, then the method is complete. However, upon determination that the travel path 130 deviates from the route 106, at 226, the method may further comprise generating one or more new deviation segments 154. Finally, after generating one or more new deviation segments 154, the navigation device 104 may then update the route deviation information 114 to include the one or more new deviation segments 154 at 228. As discussed above, the route deviation information 114 may be stored on a server in communication with the navigation device 104, thus updating the route deviation information 114 may include transmitting the one or more new deviation segments 154 to the server.

It will further be appreciated that method 200 is provided by way of example and is not meant to be limiting. Therefore, it is to be understood that method 200 may include additional and/or alternative steps relative to those illustrated in FIG. 8, and all or some steps of method 200 may be repeated for identifying any additional deviation segments. Thus, the method may be used to compute a route that includes a plurality of deviation segments. For example, two, three, four, or more deviation segments may be included in a single route, as some examples.

Further, it is to be understood that method 200 may be performed in any suitable order. Further still, it is to be understood that one or more steps may be omitted from method 200 without departing from the scope of this disclosure. In some embodiments, the methods and processes described herein may be tied to a computing system of one or more computing devices. In particular, such methods and processes may be implemented as a computer-application program or service, an application-programming interface (API), a library, and/or other computer-program product.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
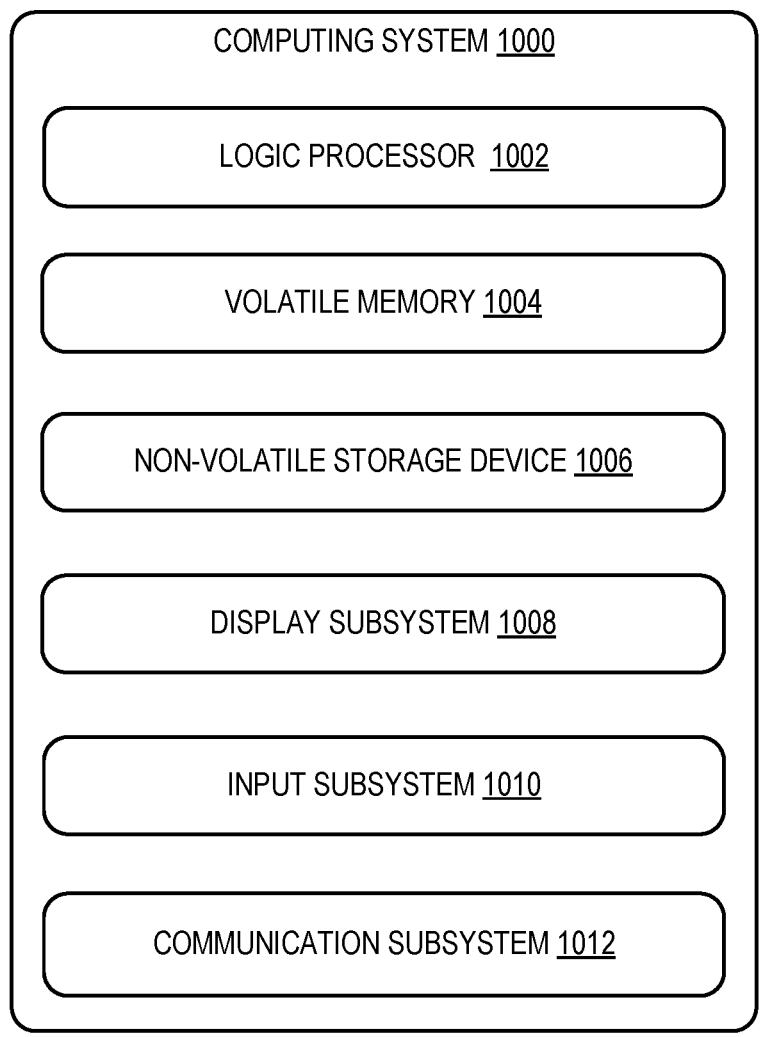
FIG. 9 shows a computing system according to an embodiment of the present description.

FIG. 9 schematically shows a non-limiting embodiment of a computing system 1000 that can enact one or more of the methods and processes described above. Computing system 1000 is shown in simplified form. Computing system 1000 may take the form of one or more navigation devices as shown in FIG. 1, or one or more devices cooperating with a navigation device (e.g., personal computers, server computers, tablet computers, home-entertainment computers, network computing devices, gaming devices, mobile computing devices, mobile communication devices (e.g., smart phone), and/or other computing devices).

Computing system 1000 includes a logic processor 1002, volatile memory 1004, and a non-volatile storage device 1006. Computing system 1000 may optionally include a display subsystem 1008, input subsystem 1010, communication subsystem 1012, and/or other components not shown in FIG. 9.

Logic processor 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1002 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1006 includes one or more physical devices configured to hold instructions executable by the logic processors to implement the methods and processes described herein. When such methods and processes are implemented, the state of non-volatile storage device 1006 may be transformed e.g., to hold different data.

Non-volatile storage device 1006 may include physical devices that are removable and/or built-in. Non-volatile storage device 1006 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 may include physical devices that include random access memory. Volatile memory 1004 is typically utilized by logic processor 1002 to temporarily store information during processing of software instructions. It will be appreciated that volatile memory 1004 typically does not continue to store instructions when power is cut to the volatile memory 1004.

Aspects of logic processor 1002, volatile memory 1004, and non-volatile storage device 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic processor 1002 executing instructions held by non-volatile storage device 1006, using portions of volatile memory 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1008 may be used to present a visual representation of data held by non-volatile storage device 1006. This visual representation may take the form of a graphical user interface (GUI). As the herein described methods and processes change the data held by the non-volatile storage device, and thus transform the state of the non-volatile storage device, the state of display subsystem 1008 may likewise be transformed to visually represent changes in the underlying data. Display subsystem 1008 may include one or more display devices utilizing virtually any type of technology. Such display devices may be combined with logic processor 1002, volatile memory 1004, and/or non-volatile storage device 1006 in a shared enclosure, or such display devices may be peripheral display devices.

When included, input subsystem 1010 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1012 may be configured to communicatively couple computing system 1000 with one or more other computing devices. Communication subsystem 1012 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

The subject matter of the disclosure is further described in the following paragraphs. According to a first aspect, a navigation device is provided, comprising one or more input devices configured to receive a starting location and an ending location, and a processor. The processor may be configured to read stored map information and stored route deviation information, wherein the stored route deviation information includes one or more deviation segments having a divergence location, a deviation path, a reconvergence location, and deviation segment data, generate a route with route data based at least on the map information, the starting location and the ending location, determine if each of the one or more deviation segments intersects the route at a plurality of intersection points and a predetermined subset of the deviation segment data matches a corresponding subset of the route data, and upon determination that each of the one or more deviation segments intersects the route at the plurality of intersection points and a predetermined subset of the deviation segment data matches a corresponding subset of the route data, generate one or more personalized routes by replacing a route portion between a first intersection point and a last intersection point of the plurality of intersection points with a corresponding deviation portion for each intersecting deviation segment. The navigation device may further include one or more output devices configured to output the route and the one or more personalized routes.

In the first aspect, the one or more input devices may further be configured to receive user preferences, the user preferences comprising at least an option to select the predetermined subset of the deviation segment data.

In the first aspect, the deviation segment data may include information about the deviation segment and the context in which the deviation segment is used.

In the first aspect, the deviation path may extend between the divergence location and the reconvergence location.

In the first aspect, the deviation path may extend between the divergence location and the reconvergence location and a predetermined distance in a plurality of directions from one or both of the divergence location and the reconvergence location.

In the first aspect, the navigation may further comprise one or more location sensors from which the navigation device determines at least a travel path of the one or more location sensors.

In the first aspect, the processor may further be configured to after generating the route, determine if the travel path deviates from the route, and upon determining that the travel path deviates from the route, generate route deviation information for one or more deviation segments, wherein each deviation segment includes at least a divergence location, a deviation path, a reconvergence location, and deviation segment data.

In the first aspect, the stored route deviation information is route deviation information may be generated by the navigation device at a time prior to generating the route.

In the first aspect, the one or more input devices may be further configured to receive user preferences from a user, the user preferences comprising at least an option to share the route deviation information with one or more predetermined groups.

In the first aspect, the one or more input devices may be further configured to receive user preferences, the user preferences comprising at least an option to receive the stored route deviation information from one or more predetermined groups.

In the first aspect, the one or more output devices may be further configured to output the one or more personalized routes with an indication that the one or more personalized routes are different from the route.

According to a second aspect of the disclosure, a method implemented at least in part by a navigation device is provided, the method comprising: receiving a request to generate a route from a starting location to an ending location; reading stored map information and route deviation information, wherein the route deviation information includes one or more deviation segments having a divergence location, a deviation path, a reconvergence location, and deviation segment data; generating the route with route data based at least on the stored map information, the starting location and the ending location; determining if each of the one or more deviation segments intersects the route at a plurality of intersection points and a predetermined subset of the deviation segment data matches a corresponding subset of the route data; upon determination that each of the one or more deviation segments intersects with the route at the plurality of intersection points and the predetermined subset of the deviation segment data matches the corresponding subset of the route data, generating one or more personalized routes by replacing a route portion between a first intersection point and a last intersection point of the plurality of intersection points with a corresponding deviation portion for each intersecting deviation segment; and outputting the route and the personalized route to an output device.

In the second aspect, the method may include receiving user preferences; and determining the predetermined subset of the deviation segment data based on the user preferences.

In the second aspect, the deviation segment data may include information about the deviation segment and the context in which the deviation segment is used.

In the second aspect, the deviation path may extend between the divergence location and the reconvergence location.

In the second aspect, the deviation path may further extend a predetermined distance in a plurality of directions from one or both of the divergence location and the reconvergence location.

In the second aspect, the method may further comprising receiving at least a location of the navigation device, and determining a travel path of the navigation device.

In the second aspect, the method may further comprise determining if the travel path deviates from the route; and upon determining that the travel path deviates from the route, generating one or more new route deviation segments; and further may comprise updating the route deviation information to include the one or more new deviation segments.

According to the second aspect, the method may further comprise receiving user preferences, wherein user preferences comprise one or more of: an option to share the route deviation information with one or more predetermined groups and an option to receive the stored route deviation information from the one or more predetermined groups.

According to a third aspect of the disclosure a method implemented at least in part by a navigation device is provided, the method comprising: receiving a request to generate a route from a starting location to an ending location; reading stored map information and route deviation information, wherein the route deviation information includes one or more deviation segments having a divergence location, a deviation path, a reconvergence location, and deviation segment data; generating the route with route data based at least on the stored map information, the starting location and the ending location; determining if each of the one or more deviation segments intersects the route at a plurality of intersection points and a predetermined subset of the deviation segment data matches a corresponding subset of the route data; upon determination that each of the one or more deviation segments intersects with the route at the plurality of intersection points and the predetermined subset of the deviation segment data matches the corresponding subset of the route data, generating one or more personalized routes by replacing a route portion between a first intersection point and a last intersection point of the plurality of intersection points with a corresponding deviation portion for each intersecting deviation segment; outputting at least the route and the personalized route to a output device; receiving at least a location of the navigation device; determining a travel path of the navigation device; determining if the travel path deviates from the route; upon determining that the travel path deviates from the route, generating one or more new deviation segments; and updating the route deviation information to include the one or more new deviation segments.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A navigation device, comprising:
one or more input devices configured to receive a starting location and an ending location;
a processor configured to:
receive a user profile including route deviation information corresponding to a user, map information, and peer-generated route deviation information generated by a plurality of peer navigation devices;
generate a route with route data based at least on the map information, the starting location, and the ending location;
based on the route deviation information corresponding to the user, identify one or more travel patterns of the user;
identify a subset of the peer-generated route deviation information that is relevant to the one or more travel patterns of the user, the subset of the peer-generated route deviation information including one or more deviation segments and deviation segment data;
determine if the one or more deviation segments intersect the route at a plurality of intersection points including a divergence location and a reconvergence location, and if a predetermined subset of the deviation segment data matches a corresponding subset of the route data; and
upon determination that the one or more deviation segments intersect the route at the plurality of intersection points and the predetermined subset of the deviation segment data matches the corresponding subset of the route data, generate one or more alternative routes for the user by replacing a route portion between a first intersection point and a last intersection point of the plurality of intersection points with a corresponding deviation portion for each intersecting deviation segment; and
one or more output devices configured to output the route and the one or more alternative routes generated for the user.

2. The navigation device of claim 1, wherein the one or more input devices are further configured to receive user preferences from the user, and wherein the user preferences comprise at least an option to select the predetermined subset of the deviation segment data.

3. The navigation device of claim 1, wherein the deviation segment data includes information about each deviation segment and a context in which the deviation segment is used.

4. The navigation device of claim 1, wherein the one or more deviation segments include a deviation path, and wherein the deviation path extends between the divergence location and the reconvergence location.

5. The navigation device of claim 4, wherein the deviation path extends between the divergence location and the reconvergence location and a predetermined distance in a plurality of directions from one or both of the divergence location and the reconvergence location.

6. The navigation device of claim 1, further comprising one or more location sensors from which the navigation device determines at least a travel path of the one or more location sensors.

7. The navigation device of claim 6, wherein the processor is further configured to:
determine if the travel path deviates from the one or more alternative routes;
upon determining that the travel path deviates from the one or more alternative routes, update the route deviation information corresponding to the user.

8. The navigation device of claim 1, wherein the route deviation information corresponding to the user is generated by the navigation device at a time prior to identifying the one or more travel patterns of the user.

9. The navigation device of claim 1, wherein the one or more input devices are further configured to receive user preferences, the user preferences comprising at least an option to receive the peer-generated route deviation information from one or more predetermined groups.

10. The navigation device of claim 1, wherein one or more output devices are further configured to output the one or more alternative routes generated for the user with an indication that the one or more alternative routes generated for the user are different from the route.

11. A method implemented at least in part by a navigation device, the method comprising:
receiving a request to generate a route from a starting location to an ending location;
receive a user profile including route deviation information corresponding to a user, map information, and peer-generated route deviation information generated by a plurality of peer navigation devices;
receiving user preferences from the user, the user preferences comprising at least an option to share the route deviation information corresponding to the user with one or more predetermined groups of other users to generate one or more personalized routes for those other users;
generating the route with route data based at least on the map information, the starting location, and the ending location;
based on the route deviation information corresponding to the user, identifying one or more travel patterns of the user;
identifying a subset of the peer-generated route deviation information that is relevant to the one or more travel patterns of the user, the subset of the peer-generated route deviation information including one or more deviation segments and deviation segment data;
determining if the one or more deviation segments intersect the route at a plurality of intersection points including a divergence location and a reconvergence location, and if a predetermined subset of the deviation segment data matches a corresponding subset of the route data;

upon determination that the one or more deviation segments intersects with the route at the plurality of intersection points and the predetermined subset of the deviation segment data matches the corresponding subset of the route data, generating one or more alternative routes for the user by replacing a route portion between a first intersection point and a last intersection point of the plurality of intersection points with a corresponding deviation portion for each intersecting deviation segment; and outputting the route and the one or more alternative routes generated for the user to an output device.

12. The method of claim 11,
wherein the predetermined subset of the deviation segment data is determined based on the user preferences.

13. The method of claim 11, wherein the deviation segment data includes information about each deviation segment and a context in which the deviation segment is used.

14. The method of claim 11, wherein the one or more deviation segments include a deviation path, and wherein the deviation path extends between the divergence location and the reconvergence location.

15. The method of claim 14, wherein the deviation path further extends a predetermined distance in a plurality of directions from one or both of the divergence location and the reconvergence location.

16. The method of claim 11, further comprising:
receiving at least a location of the navigation device; and
determining a travel path of the navigation device.

17. The method of claim 16, further comprising:
determining if the travel path deviates from the one or more alternative routes; and
upon determining that the travel path deviates from the one or more alternative routes, updating the route deviation information corresponding to the user.

18. The method of claim 11, wherein the user preferences further comprise an option to receive the peer-generated route deviation information from one or more predetermined groups.

19. A method implemented at least in part by a navigation device, the method comprising:
receiving a request to generate a route from a starting location to an ending location;

receiving a user profile including route deviation information corresponding to a user, map information, and peer-generated route deviation information generated by a plurality of peer navigation devices;

receiving user preferences from the user, the user preferences comprising at least an option to share the route deviation information corresponding to the user with one or more predetermined groups of other users to generate one or more personalized routes for those other users;

generating the route with route data based at least on the map information, the starting location, and the ending location;

based on the route deviation information corresponding to the user, identifying one or more travel patterns of the user;

identifying a subset of the peer-generated route deviation information that is relevant to the one or more travel patterns of the user, the subset of the peer-generated route deviation information including one or more deviation segments and deviation segment data;

determining if the one or more deviation segments intersect the route at a plurality of intersection points including a divergence location and a reconvergence location, and if a predetermined subset of the deviation segment data matches a corresponding subset of the route data;

upon determination that the one or more deviation segments intersects with the route at the plurality of intersection points and the predetermined subset of the deviation segment data matches the corresponding subset of the route data, generating one or more alternative routes for the user by replacing a route portion between a first intersection point and a last intersection point of the plurality of intersection points with a corresponding deviation portion for each intersecting deviation segment;

outputting at least the route and the one or more alternative routes generated for the user to an output device;

receiving at least a location of the navigation device;
determining a travel path of the navigation device;
determining if the travel path deviates from the one or more alternative routes; and
upon determining that the travel path deviates from the one or more alternative routes, updating the route deviation information corresponding to the user.

* * * * *